J. G. Winger,
Cotton Press,
Nº 9,124. Patented July 13, 1852.

J. G. Winger,
Cotton Press,
Nº 9,124. Patented July 13, 1852.

UNITED STATES PATENT OFFICE.

JACOB G. WINGER, OF VICKSBURG, MISSISSIPPI.

IMPROVEMENT IN COTTON-PRESSES.

Specification forming part of Letters Patent No. 9,124, dated July 13, 1852.

*To all whom it may concern:*

Be it known that I, JACOB G. WINGER, of Vicksburg, in the county of Warren and State of Mississippi, have invented certain new and useful Improvements in Cotton and other Presses; and I do hereby declare that the following is a full, clear, and exact description thereof, reference being had to the annexed drawings, and to letters of reference marked thereon, making a part of this specification, in which—

Figure 1:
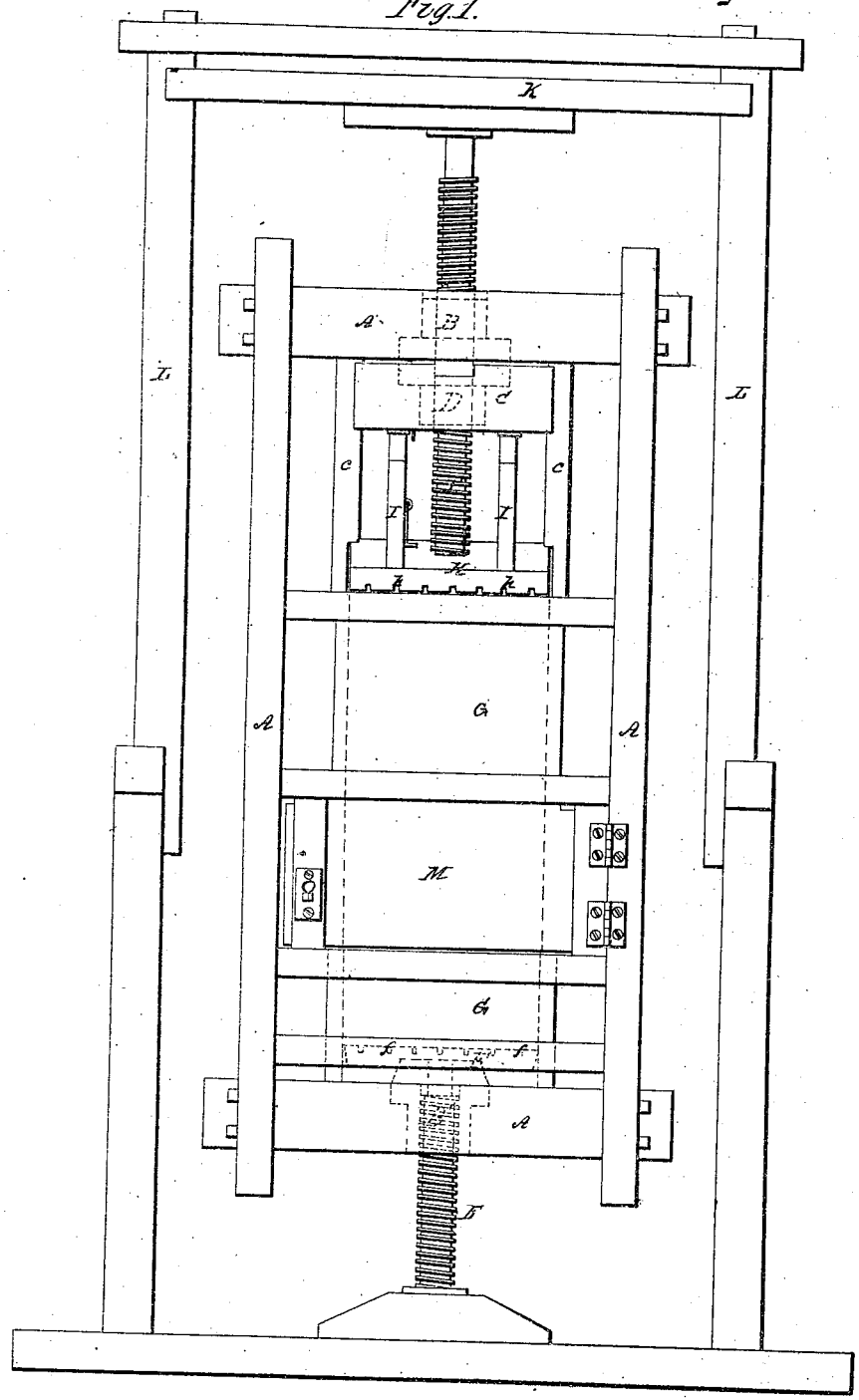
Figure 3:
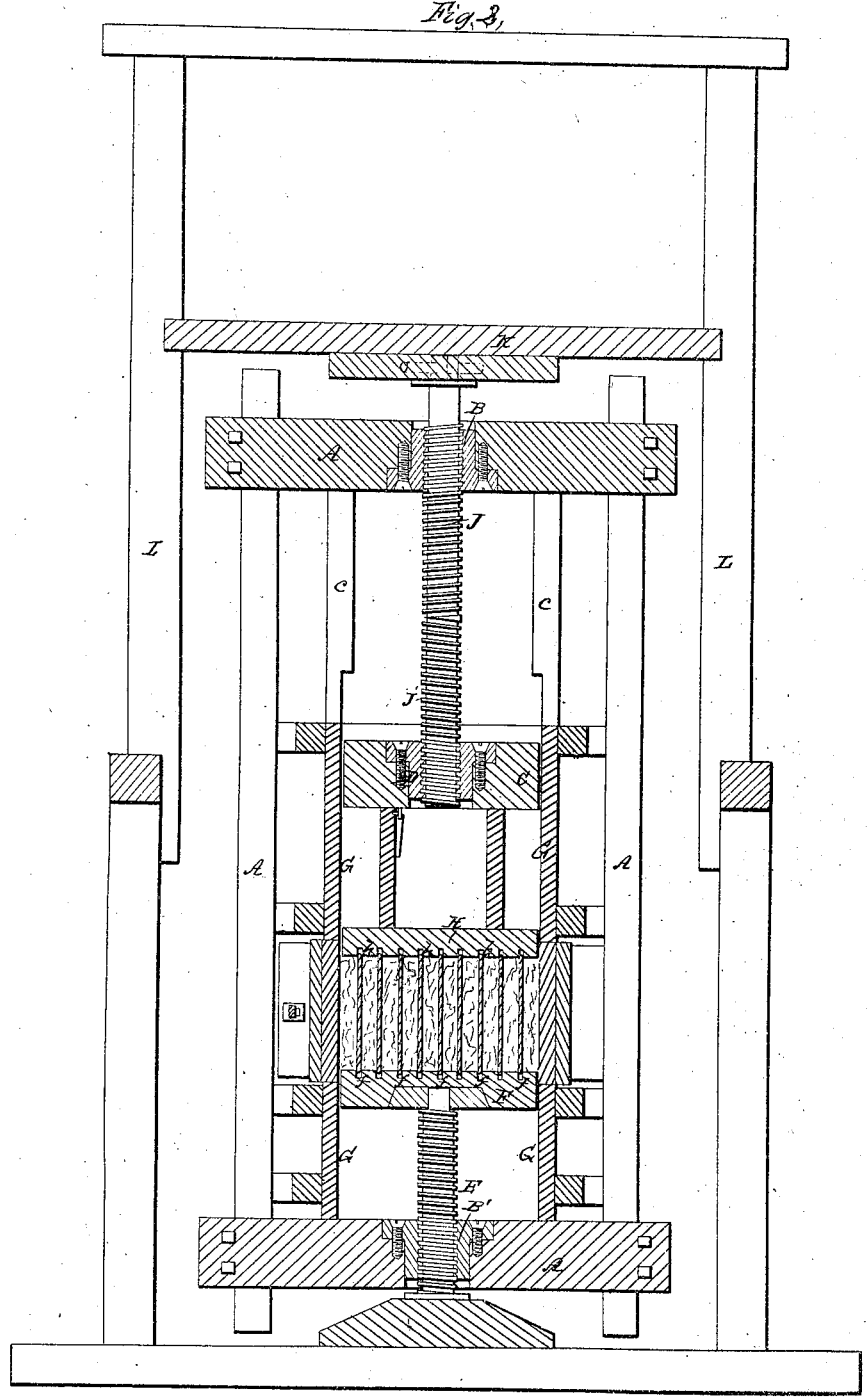

Figure 1 is a side elevation of the press, shown in position to receive the cotton to be pressed. Fig. 2 is a vertical longitudinal section through the center, (the screws and bale of cotton being in elevation,) showing the respective position of all parts when the bale is pressed and bound.

The nature of my invention consists in constructing a press with two right-hand and one left-hand screws, or two left-hand and one right, as hereinafter described, so as to give three times the progressive motion to the follower in the same time that would be effected by a single screw, and so arranging it that the entire weight of the frame and chamber of the press is made effective to aid in pressing the bale.

To enable others to make and use my invention, I will proceed to describe its construction and operation.

A is a strong, heavy frame, which receives all the strain of the press on its upper and lower cross-beams, which are provided with female screws B B', placed vertically through the center of each, and in line with each other, the one at the top having a right-hand thread, that at the bottom a left-hand one.

C is the cross-head of the follower, and slides on vertical guide-rods *c*. Said cross-head is also provided with a left-hand female screw, D, through its center in line with those marked B B' in the top and bottom of the frame.

E is a left-hand screw, forming a permanent standard, secured to the flooring of the room, and over which the female screw B' (in the lower part of the press-frame) turns. On the top of this screw E is pivoted the bed-plate F of the press, which is of the desired length and breadth of the bale, and fits loosely in the chamber G, and is chased with grooves *f* in its face for the passage of the cordage around the bale while in the press.

H is the follower, corresponding in size and form with the bed-plate, and has grooves *h* in its face. This follower is suspended, face downward, by the slings I I from the cross-head C.

J J' is a screw of the same diameter and number of threads to the inch as the screw E. It is cut from its center downward left-handed, and screws through the female screw D in the cross-head, and from the center upward it is cut right-handed, and screws through the female screw B in the upper part of the frame, and at its upper end is firmly attached to the sliding cross-beam K. This cross-beam is provided with vertical guide-rods L—one at each end—which may be erected in form of a gallows, as shown, or more generally attached to the framing of the building.

As it is commonly understood that cotton can be pressed into one-fourth of its bulk, I propose to make the chamber G of the ordinary length and breadth of a bale of cotton, and of four times its depth, and the screws J, J', and E each to travel through its respective nut one-fourth of the depth of said chamber. Thus, when the bed-plate and follower are screwed up to the closest pitch, there will be one-fourth of the depth of the chamber between them to be occupied by the bale of cotton when pressed.

In operating this machine the frame must be first turned on the screws as far they will permit, traveling round to the right, which will elevate the frame A until its lower cross-beam strikes the under side of the bed-plate F, while by the action of the right-and-left screw J J' the upper cross-beam of the frame and the cross-head C will be brought in contact with each other, in which position the follower H is at liberty to swing clear of the top of the chamber G, which is then to be filled with cotton and trampled in, the cloth being put over and under in the usual manner. The follower H is to be brought back in its position over the chamber, and the frame turned on the screws by horse, steam, or other power, traveling to the left, by which the frame will be screwed down on the screw E, the chamber sliding over the bed-plate F, which revolves with the chamber on the top of said screw. At the same time, by the action of the right-and-left screw J J', the follower H will travel double the distance into the top end of the chamber. Thus the two plates F and H both act as followers in pressing on the top and bottom of the bale, and the follower is made to perform a distance toward the bed-plate of three-fourths the depth of the chamber, while the frame, to which the power is applied, is turned over a screw of one-fourth said depth of chamber, which is consequently effected in one-third of the time required by the ordinary single-screw press, and the entire weight of the frame-work being thrown upon the screw E, it travels downward as on an inclined plane, (when pressing,) which operates materially to lessen the power required to turn it. When sufficiently pressed, the doors M in the sides of the chamber may be thrown open, and the bale bound while in the press, and then delivered at either side. The doors may be then closed again, and the frame turned to the right to bring it in position to receive another supply of cotton, as before described. It is deemed unnecessary to specify at length that right-hand screws may be substituted for the left-hand ones, and a left-hand one in place of the right-hand screw, the effect of which would simply be to reverse the travel of the frame in pressing the bale and clearing or elevating the follower.

This form of press is equally applicable for baling hay, hemp, hops, &c.

Having thus described my invention, what I claim therein as new, and desire to secure by Letters Patent, is—

1. The arrangement and combination of the screws J, J', and E with the top and bottom cross-beams of the frame and the cross-head of the follower, by which the follower and bed-plate are made to press the bale from top and bottom, and the distance traveled by the follower toward the bed-plate is three times that of the frame (to which the power is applied) over the screw.

2. Making the weight of the press and auxiliary power by resting it entirely on the lower screw, E, so that in pressing the bale the frame is traveling down the screw as on an inclined plane.

In testimony whereof I have hereunto signed my name before two subscribing witnesses.

J. G. WINGER.

Witnesses:
WM. P. ELLIOT,
WM. M. SMITH.